June 25, 1963 — V. N. SAFFIRE — 3,095,317

CATHODE RAY TUBE SCREENING

Filed Oct. 27, 1959

INVENTOR:
VICTOR N. SAFFIRE,
BY Robert J. Mooney
HIS ATTORNEY.

United States Patent Office 3,095,317
Patented June 25, 1963

3,095,317
CATHODE RAY TUBE SCREENING
Victor N. Saffire, Lafayette Hills, Pa., assignor to General
Electric Company, a corporation of New York
Filed Oct. 27, 1959, Ser. No. 849,100
7 Claims. (Cl. 117—33.5)

This invention relates to the manufacture of cathode ray tubes and more particularly to the formation of screens of phosphor or other luminescent material on substrates such as the interior surfaces of the faceplate portions of cathode ray tube envelopes.

Cathode ray tube screens have conventionally been formed by a liquid settling process in which the tube envelope or bulb is disposed in a faceplate-downward attitude, a screen settling solution containing the necessary screen-forming ingredients and binding ingredients together with a suitable amount of a liquid such as water is placed in the bulb, and the screen-forming and binding ingredients are allowed to settle through the liquid onto the interior surface of the faceplate or other screen substrate. Uniformity of dispersion and distribution of the screen-forming ingredients is enhanced by a modification of this liquid settling process wherein the luminescent screen material, in finely divided form and mixed to form a slurry with a portion of the total liquid charge, is sprayed onto the surface of the remaining portion of the settling solution in the bulb, from a spray nozzle inserted through the neck of the bulb and disposed above the surface of the liquid in the bulb. This spraying technique tends to improve uniformity of distribution of the luminescent screen material across the entire surface of the liquid charge in the bulb, and thereby contributes to more uniform distribution of the luminescent screen material on the substrate on which it settles. However, in cathode ray tubes having extremely wide cone angles, such as to accommodate very large electron beam deflection angles of the order of 120° and more, it is extremely difficult if not impossible to obtain the desired uniformity of distribution of luminescent material by means of either a conventional settling process or even one using the above-mentioned slurry-spray technique in combination with liquid settling. Important reasons for this are the fact that in cathode ray tube envelopes with very wide cone angles it is extremely difficult to spray the phophor or other luminescent screen material uniformly across the entire surface of the liquid charge within the bulb, and also, when the bulb is filled with a liquid charge of a depth adequate to insure desired dispersion during settling, the extremely large cone angle confines the surface of the liquid charge to an area much smaller than the interior surface of the faceplate so that proper distribution of phosphor settling downward onto the faceplate from the liquid charge surface is practically impossible to achieve. Further, the often reduced inside diameter of the necks of the wider angle tubes increases the difficulty of inserting a suitable phosphor slurry spray device into the tube envelope through the neck.

Accordingly, a principal object of the present invention is to provide an improved method of forming luminescent screens on the interior faceplate surfaces of cathode ray tubes having extremely wide cone angles of the order of 120° and more.

Another object of the present invention is to provide an improved phosphor screen forming method of the foregoing character which is fast and inexpensive, which requires a minimum of expensive equipment, which may be readily performed by relatively unskilled personnel, which is an all-wet process requiring no intermediate time consuming drying operations, and which affords a maximum degree of control of screen thickness and other desired screen characteristics.

These and other objects of the present invention will be apparent from the following description taken in conjunction with the accompanying drawing wherein.

Figure 1:
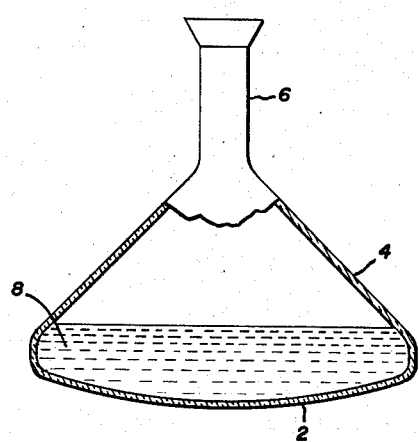
FIG. 1 is a view of a cathode ray tube bulb partially broken away to show a charge of settling solution therein.

FIG. 1 shows a cathode ray tube envelope including a faceplate 2 the interior surface of which forms a screen-supporting substrate, a funnel or cone portion 4 and a neck 6. The envelope is disposed in a faceplate downward position and is shown containing a charge of a conventional screen-settling solution 8 which may include for example deionized water, finely divided phosphor, a suitable binder such as potassium silicate, and a suitable electrolyte such as barium acetate.

Figure 2:
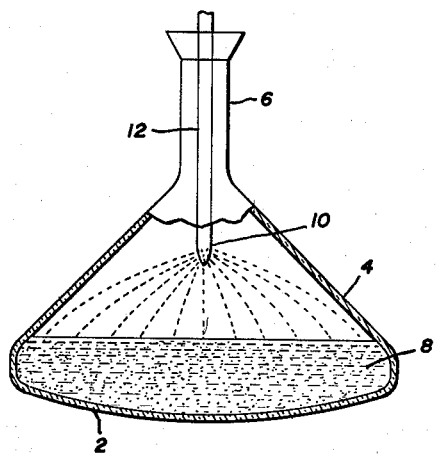
FIG. 2 is a view similar to FIG. 1 showing a conventional method of spray distribution of the luminescent screen material over the settling solution.

In FIG. 2 is shown a conventional method of introducing a phosphor to obtain enhanced uniformity of distribution, by spraying a phosphor-containing slurry from a spray tip or nozzle 10 over the surface of the remaining portion of the settling solution. The spray nozzle is supplied through a tube 12 inserted through the neck of the tube envelope.

Figure 3:
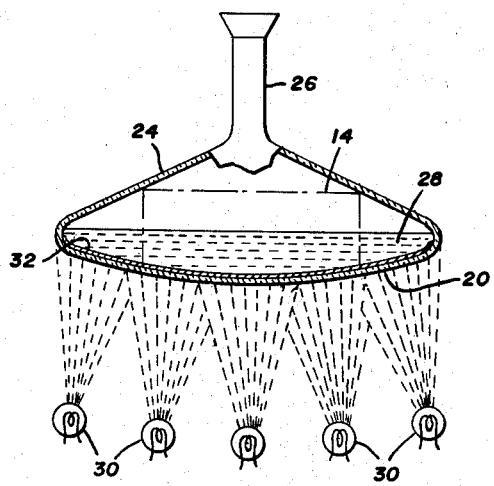
FIG. 3 is another view of a cathode ray tube envelope showing a first phase of a screen forming method according to the present invention.

In screening the wider cone angle bulb of FIG. 3, it will be evident that the liquid settling processes of FIGS. 1 and 2 are less satisfactory because when the bulb is filled to the desired depth for adequate dispersion of phosphor during settling, it will be seen that the surface of such a liquid charge, as shown by reference line 14 in FIG. 3, is much smaller in area than the substrate to be screened. Thus luminescent screen material settled by prior art methods will tend to be much thinner at the edges than in the center of the screen. In applying the screen making process of the present invention to the bulb of FIG. 3, the bulb is arranged with its faceplate 20 down, as shown. The interior surface of the faceplate is preferably initially wetted, as with deionized water, and this may be conveniently accomplished by simply not drying the bulb after its earlier washing. Next there is introduced into the bulb a charge of screening solution 28 consisting of a mixture of finely divided phosphor, deionized water, and a liquid photo-sensitive resist capable of being made solid or substantially solid when exposed to suitable radiation such as light rays. One suitable resist is polyvinyl alcohol, sensitized to ultra-violet light by addition of ammonium or potassium dichromate.

The screening solution is added to the bulb in sufficient quantity preferably to fully cover the screen substrate to a nominal depth of, for example, one half inch. The liquid charge may, if desired, be slightly agitated to assure homogeneous distribution of the phosphor therein as well as good wetting of the screen substrate. The interface of the liquid and screen substrate is then exposed to radiation suitable for polymerizing or solidifying the resist. The exposure may be conveniently accomplished with a suitable source of resist-solidifying radiation, such as a battery of ultraviolet lamps 30, disposed outside the tube envelope so as to shine through it to the liquid interface. This causes the resist in the portion of the liquid charge 28 immediately adjacent the interior surface of the faceplate to be solidified first by the radiation, this solidifying of the resist serving to trap or lock in place adjacent the interior surface of the faceplate that portion of the phosphor suspended or dispersed within the solidified resist.

Continued exposure causes more and more of the resist to solidify, building up an increasingly thicker layer 32 of solidified resist on the faceplate interior surface. Thus by controlling either the exposure time and intensity, or the concentration of the resist, or the sensitivity of the resist, a screen layer of any desired thickness or quantity of phosphor may be made. Since both the intensity and pattern of intensity of radiation impinging on the exterior surface of the faceplate may be readily controlled by merely varying the number, position, or intensity of the exterior radiation sources, it will be appreciated that optimum uniformity of screen thickness may be easily obtained, or any other screen thickness configuration, such as a thick center and thin edges or vice versa, may be readily achieved. Likewise, it will be appreciated that by controlling the configuration or pattern of the radiation falling on the faceplate 20, the resist will be solidified only on selected increments of the faceplate interior surface, thereby resulting in a screen or layer of particular luminescent material having a desired pattern.

In addition to length of exposure time, and radiation intensity, the solidified layer thickness is also directly proportional to the resist concentration and amount of sensitizer used. Thus it will be understood that by appropriate choice of resist or sensitizer concentration, or radiation intensity, exposure duration may be varied as desired, and either a large or small degree of sensitivity or tolerance to changes in exposure duration may be obtained.

Figure 4:
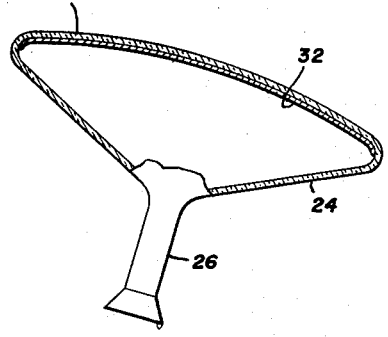
FIG. 4 is a view of a cathode ray tube envelope showing a later phase of a screen forming method according to the present invention.

After the exposure step the excess liquid is removed from the bulb for example by siphoning or pouring off as shown in FIG. 4. The residual screen layer may then be rinsed with deionized water if desired, and is then allowed to dry. The screen layer is then ready for a baking operation, for example at 415° F., for 2 hours, which evaporates and drives off the solidified resist, leaving in place the desired phosphor screen layer. If desired, the screen may be filmed and metallized by conventional techniques before the bakeout step, the bakeout serving to volatilize and drive off the film lacquer along with the resist. Also, if desired, the bond of the residual phosphor layer to the screen substrate may be enhanced by addition to the screen layer of a suitable binder, such as an aqueous solution of potassium silicate, which may then be dried in place. Conveniently, if the screen is to be metallized, the potassium silicate binder may serve as an underlayer for the lacquer film.

Other well known photo-sensitive resists may be employed according to the invention, the requirements for the resist being merely that it be compatible with the phosphor, capable of being homogeneously mixed with the phosphor, and removable by the heat of the bakeout step without leaving a contaminating residue. One other suitable resist is gelatin, i.e. the organic material derived from animal proteins.

The following is a detailed specific example of a screen making process according to the present invention:

First there is prepared a stock photo-sensitive resist solution consisting of 1900 cc. of deionized water, 90 grams of polyvinyl alcohol (obtainable commercially from E. I. du Pont de Nemours Co. as "Elvanol" type 52–22) and 8 drops of a suitable anti-foaming agent such as that available commercially as "Lano-lubric." I then prepare a screening solution consisting of 450 cc. of the PVA stock solution, 1350 cc. of deionized water, 2.5 grams of ammonium dichromate, and 50 grams of General Electric Co. No. M30 white-body P4 phosphor, a zinc sulfide-zinc cadmium sulfide phosphor conventionally used for monochrome television picture tube screens. A sufficient quantity of this screening solution to fully cover the tube faceplate to a depth of about ½ inch is then dispensed into a cathode ray tube envelope, and preferably agitated slightly to assure good wetting of the interior faceplate surface. The bulb is then suspended over a group of six 15 watt ultraviolet fluorescent lamps, the lamps being spaced about 7 to 12 inches from the outside of the faceplate, and exposed for about 1 to 3 minutes until a screen layer of desired thickness is formed. During exposure, if desired, the bulb may be gently rocked to maintain a slight agitation of the screening solution. After exposure, the screening solution is poured out. If desired the screening solution may be poured directly into the next bulb to be screened. The bulb can now, if desired, be rinsed with water and the screen layer is then allowed to dry. The screen layer may then be filmed and metallized as desired, and finally the bulb is baked out at about 400° F. for about 2 hours.

The screen-making process herein described is completely a wet process requiring no intermediate time consuming drying steps, and has the important additional advantages of convenient and complete process control, and relative speed. Moreover the excess screening solution removed from a bulb after solidification of the desired screen layer is completely reuseable, so that considerable economies in consumption of phosphor and other ingredients are obtainable.

It will be appreciated by those skilled in the art that the invention may be carried out in various ways and may take various forms and embodiments other than those illustrative embodiments heretofore described. It is to be understood that the scope of the invention is not limited by the details of the foregoing description, but will be defined in the following claims.

What I claim as new and desire to secure by Letters Patent of the United States is:

1. A method of making cathode ray tube screens comprising covering a screen support substrate to a substantial depth with a pool of liquid screen solution including particles of luminescent screen material mixed with a photo-sensitive resist, while said substrate is covered by said liquid pool exposing said solution with light incident through said substrate to solidify on said substrate a layer of said solution having particles of luminescent screen material entrapped therein, continuing said exposure to progressively solidify the portion of said solution at the interface thereof with the solidified material therebeneath, terminating said exposure when the layer of said solidified material has built up to the desired thickness, removing the remainder of said liquid pool covering said solidified layer, drying said solidified layer, and applying heat to the dried layer for a sufficient period to volatilize and remove therefrom the resist portions of said dried layer.

2. The method defined in claim 1 wherein said solution comprises by weight 0.5 to 1.5% dichromate sensitized polyvinyl alcohol, 1 to 4% phosphor, and the balance deionized water.

3. A method of making cathode ray tube screens comprising covering a screen support substrate with a pool of liquid screen solution including particulate phosphor mixed with a photo-sensitive resist including polyvinyl alcohol, while said substrate is covered by said liquid pool exposing said substrate with light and thereby progressively polymerizing the portion of said solution at the interface thereof with said solid material therebeneath to build up a solidified layer of desired thickness having phosphor particles entrapped therein, drying said solidified layer, and applying heat to the dried layer for a sufficient period to volatilize and remove therefrom the resist portions of said dried layer.

4. A method of screening cathode ray tubes comprising covering the screen support substrate with a pool of liquid solution including particles of luminescent material and a photo-sensitive resist, while said substrate is covered by said liquid pool exposing the interface of the solution and substrate with light rays to solidify the portion of resist adjacent thereto and form on said interface a layer of solidified resist with particles of luminescent material entrapped therein, continuing the exposure for a sufficient period to obtain a solidified layer having the desired thickness, removing the remainder of said liquid pool, and heating the solidified layer sufficiently to volatilize and drive off the resist portion thereof.

5. A method of making cathode ray tube screens comprising covering a screen support substrate with a pool of liquid screening solution including particles of luminescent screen material mixed with a photo-sensitive resist, while said substrate is still covered by said pool exposing said solution with radiation incident through said substrate and thereby progressively polymerizing the portion of said solution at the interface thereof with the solid material therebeneath to build up on said substrate a solidified layer of said solution of desired thickness having particles of luminescent screen material entrapped therein, removing the remainder of said liquid pool covering said solidified layer, drying said solidified layer, and applying heat to the dried layer for a sufficient period to volatilize and remove therefrom the resist portions of said dried layer.

6. The method defined in claim 5 wherein said liquid solution is agitated during said progressive polymerization.

7. The method defined in claim 5 wherein the thickness of said progressive polymerization over different areas of said substrate is varied by corresponding variation in the respective intensities of radiation passing through said different respective areas of said substrate.

References Cited in the file of this patent

UNITED STATES PATENTS

| | | |
|---|---|---|
| 2,827,390 | Garrigus | Mar. 18, 1958 |
| 2,837,429 | Whiting | June 3, 1958 |
| 2,888,361 | Curry | May 26, 1959 |
| 2,903,377 | Saulnier | Sept. 8, 1959 |

FOREIGN PATENTS

| | | |
|---|---|---|
| 1,036,400 | Germany | Aug. 14, 1958 |